(12) United States Patent
Yin et al.

(10) Patent No.: US 11,136,433 B2
(45) Date of Patent: Oct. 5, 2021

(54) SELF-HEALING COPOLYMERIZED POLYCARBONATE AND PREPARATION METHOD THEREFOR

(71) Applicant: PUYANG SHENGTONGJUYUAN ADVANCED MATERIALS CO., LTD., Puyang (CN)

(72) Inventors: Penggang Yin, Puyang (CN); Guoqiang Cheng, Puyang (CN); Jingwei Li, Puyang (CN); Guanghui Dang, Puyang (CN); Jihui Zhu, Puyang (CN); Jihua Shi, Puyang (CN); Huaxiang Chen, Puyang (CN); Ying Chen, Puyang (CN)

(73) Assignee: PUYANG SHENGTONGJUYUAN ADVANCED MATERIALS CO., LTD., Puyang (CN)

( * ) Notice: Subject to any disclaimer, the term of this patent is extended or adjusted under 35 U.S.C. 154(b) by 38 days.

(21) Appl. No.: 16/812,465

(22) Filed: Mar. 9, 2020

(65) Prior Publication Data

US 2020/0308345 A1    Oct. 1, 2020

(51) Int. Cl.
   *C08G 64/16*    (2006.01)
   *C08G 64/30*    (2006.01)
   *C08G 64/06*    (2006.01)
   *C08G 64/18*    (2006.01)

(52) U.S. Cl.
   CPC ........... *C08G 64/307* (2013.01); *C08G 64/06* (2013.01); *C08G 64/1608* (2013.01); *C08G 64/18* (2013.01); *C08G 2230/00* (2013.01)

(58) Field of Classification Search
   None
   See application file for complete search history.

(56) References Cited

U.S. PATENT DOCUMENTS

2010/0266784 A1   10/2010  Urban et al.
2016/0235650 A1*   8/2016  Simard ................... A61Q 3/02

FOREIGN PATENT DOCUMENTS

JP    2011219750    * 11/2011

* cited by examiner

*Primary Examiner* — David J Buttner

(57) ABSTRACT

The invention relates to a self-healing copolymerized polycarbonate and a preparation method thereof. The method comprises the following steps: mixing a reducing sugar, an oxetane derivative and a first catalyst, heating and reacting at 50 to 80° C. for 0.5 to 2 h to obtain the first product; adding a diol, a diester and a second catalyst to the first product, and then heating to 180 to 220° C. for 2 to 4 h to obtain an oligomer; heating the oligomer to 230 to 270° C. and holding at the temperature and reacting for 1 to 3 h to obtain a self-healing copolymerized polycarbonate. The self-healing copolymerized polycarbonate material prepared by the method of the invention has self-healing property and biodegradability, which ensures the consistency and uniformity of the product. In addition, the block introduced into the main chain is green and environmentally friendly, and the original intention of clean production of polycarbonate has not been changed.

17 Claims, 2 Drawing Sheets

SELF-HEALING COPOLYMERIZED POLYCARBONATE AND PREPARATION METHOD THEREFOR

RELATED APPLICATION

The application claims the benefit of the Chinese Patent Application CN201910234541.3 filed Mar. 26, 2019, which is incorporated herein by reference in its entirety.

FIELD OF THE INVENTION

The invention belongs to the field of copolymerized polymers, and particularly relates to a self-healing copolymerized polycarbonate and a preparation method thereof.

BACKGROUND OF THE INVENTION

Polycarbonate is a heat-shrinkable engineering plastic with excellent comprehensive properties. It has high transmittance, high impact resistance, high toughness, weather resistance, and excellent electrical insulation, and is widely used in the automotive industry, instrumentation, electronics and electric appliances, building materials and other fields.

In order to make the polycarbonate resin applicable to a wider range of fields, it is the focus of current research to modify the polycarbonate according to the thermal properties of the applied field, thereby improving certain characteristics of the polycarbonate.

Random copolymerization is a simple and effective important method to adjust and improve the properties of polymer materials. Polycarbonates are susceptible to the mechanical forces, especially in outdoor applications, and, thus, may develop scratches and cracks over the time leading to poor surface aesthetics and in some cases, failure of structural integrity.

Self-healing smart materials can autonomously repair scratches and cracks generated. U.S. Pat. No. 8,846,801 discloses the use of polyurethanes incorporated with carbon nanotubes to introduce intrinsic healing property into polycarbonates while maintaining exceptional mechanical properties and shape-memory. However, the presence of carbon nanotubes may affect transparency of the polycarbonate material and limit its applications. U.S. Pat. No. 7,998,529 discloses haze-free and healing coatings on polycarbonate substrates, wherein two isocyanate groups per mole of polycarbonate have been introduced into the polymer backbone and the resulting substrate has been coated with a polyisocyanate healing agent. U.S. Patent Publication No. 2014/0037964 discloses the coating of a healing material on polycarbonate substrates, wherein the healing layer is composed of the mixture of a polycarbonate polyol, a polyisocyanate, a solvent, and a surfactant. However, such systems are not capable of multiple healings of damages since the healing mechanism is driven by irreversible cross-linking mechanisms.

Chinese Patent Publication No. CN108699228A discloses an intrinsic healing polycarbonate, wherein an aromatic disulfide is introduced into the main chain, and the healing property is attributed to sulfur-sulfur bonds and its ability to displace. However, the modification process of aromatic diols does not meet environment-friendly requirements, and the destruction or oxidation of the disulfide bond will also have a certain impact on the environment.

OBJECTS AND SUMMARY OF THE INVENTION

An object of the present invention is to provide a method for preparing a self-healing copolymerized polycarbonate.

A method for preparing a self-healing copolymerized polycarbonate according to the present invention comprises the following steps: S101: mixing a reducing sugar, an oxetane derivative and a first catalyst and heating to 50 to 80° C., stirring and reacting for 0.5 to 2 h under a protective gas condition to obtain a first product, wherein the molar ratio of the reducing sugar to the oxetane derivative is (0.5-0.8):1; S102: adding a diol, a diester and a second catalyst to the first product, and then heating to 180 to 220° C., and holding at the temperature and reacting for 2 to 4 h to obtain an oligomer, wherein the molar ratio of the first product, the diol and the diester is (0.07-0.13):(0.9-1.0):1; S103: heating the oligomer to 230 to 270° C., and holding at the temperature and reacting for 1 to 3 h to obtain a self-healing copolymerized polycarbonate.

The self-healing copolymerized polycarbonate material prepared by the method of the invention has self-healing property and biodegradability. The self-healing copolymerized polycarbonate is obtained by introducing a modified reducing sugar into the main chain of polycarbonate, belonging to block copolymerization, which ensures the consistency and uniformity of the product. In addition, the block introduced into the main chain is green and environmentally friendly, and the original intention of clean production of polycarbonate has not been changed.

In addition, the method for preparing the above-mentioned self-healing function copolymerized polycarbonate of the present invention may also have the following additional technical features:

Further, in the step S101, the reducing sugar is at least one of glucose, fructose, galactose, lactose, and maltose.

Further, in the step S101, the oxetane derivative is at least one of 3-(chloromethyl)-3-methyloxetane, 3-(bromomethyl)-3-methyloxetane, 3-(bromomethyl)-3-ethyloxetane, and 3-(chloromethyl)-3-ethyloxetane.

Further, in the step S101, the catalyst is a Lewis base.

Further, in the step S101, the catalyst is at least one of KOH, $K_2CO_3$, and $CsCO_3$.

Further, in the step S101, the protective gas is nitrogen.

Further, in the step S102, the diol is bisphenol A, and the diester is diphenyl carbonate.

Further, in the step S101, the mass of the first catalyst is 0.05-0.1% of the mass of the reducing sugar.

Further, in the step S102, the ratio of the total molar mass of the first product and the diol to the molar mass of the diester is $1.03:1 \leq n_1:n_2 \leq 1.1:1$, wherein, $n_1$ represents the total molar mass of the first product and the diol, and $n_2$ represents the molar mass of the diol.

Another object of the present invention is to provide a self-healing copolymerized polycarbonate prepared by the mentioned method.

Additional aspects and advantages of the present invention will be given in part in the following description, and part of them will become apparent from the following description, or be learned through the practice of the present invention.

DETAILED DESCRIPTION OF THE EMBODIMENTS

Figure 1A:
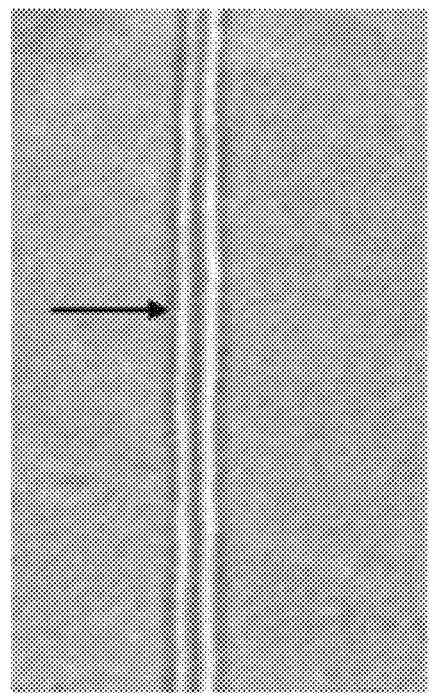
FIG. 1a is a microscopic image of scratch made on the surface of the product of the embodiment of the present invention with a diamond tip.

Hereinafter, embodiments of the present invention will be described in detail. Examples of the embodiments are shown in the accompanying drawings; wherein the same or similar reference numerals throughout represent the same or similar elements or elements having the same or similar functions. The examples described below with reference to the drawings are exemplary and are intended to explain the present invention, but should not be construed as limiting the present invention.

Unless otherwise specified, the experimental methods in the following embodiments are conventional methods.

Unless otherwise specified, the test materials used in the following examples are purchased from conventional reagent stores.

For the quantitative tests in the following examples, three repeated experiments are set, and the data are the mean value or the mean value±standard deviation of the three repeated experiments.

Example 1

(a) 1.6 mol of glucose, 2 mol of 3-chloromethyl-3-methylbutylene oxide, and a catalyst cesium carbonate (0.1% by mass of glucose) were reacted under the protection of $N_2$ at 80° C. for 0.5 h to obtain a product 1; (b) a diol and a diester were added to the obtained product 1 (the molar ratio of the three was 0.07:1:1), the mixture was heated up to 220° C. to react for 2 h to obtain an oligomer; and (c) the oligomer was heated up to 270° C., and the reaction was continued for 1.5 h to obtain a polycarbonate copolymer.

Example 2

(a) 1 mol of glucose, 2 mol of 3-chloromethyl-3-methylbutylene oxide, and a catalyst cesium carbonate (0.05% by mass of glucose) were reacted under the protection of $N_2$ at 50° C. for 2 h to obtain a product 1; (b) a diol and a diester were added to the obtained product 1 (the molar ratio of the three was 0.13:0.9:1), the mixture was heated up to 180° C. to react for 4 h to obtain an oligomer; and (c) the oligomer was heated up to 230° C., and the reaction was continued for 3 h to obtain a polycarbonate copolymer.

Example 3

(a) 1.8 mol of glucose, 2 mol of 3-chloromethyl-3-methylbutylene oxide, and a catalyst cesium carbonate (0.08% by mass of glucose) were reacted under the protection of $N_2$ at 70° C. for 1.5 h to obtain a product 1; (b) a diol and a diester were added to the obtained product 1 (the molar ratio of the three was 0.1:1:1), the mixture was heated up to 210° C. to react for 4 h to obtain an oligomer; and (c) the oligomer was heated up to 250° C., and the reaction was continued for 2 h to obtain a polycarbonate copolymer.

Example 4

(a) 1.8 mol of glucose, 2 mol of 3-chloromethyl-3-methylbutylene oxide, and a catalyst cesium carbonate (0.08% by mass of glucose) were reacted under the protection of $N_2$ at 70° C. for 1.5 h to obtain a product 1; (b) a diol and a diester were added to the obtained product 1 (the molar ratio of the three was 0.1:1:1), the mixture was heated up to 210° C. to react for 4 h to obtain an oligomer; and (c) the oligomer was heated up to 250° C., and the reaction was continued for 2 h to obtain a polycarbonate copolymer.

Figure 1B:
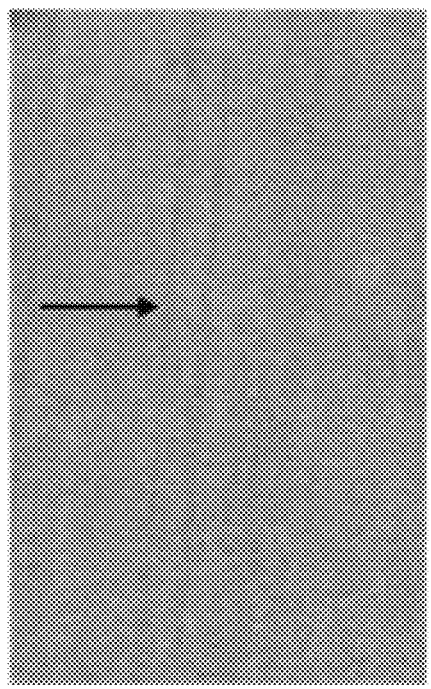
FIG. 1b is a microscopic image of the scratched area of FIG. 1a after self-healing.

As shown in FIG. 1, the products obtained in Examples 1 to 4 were made into a 4 cm*4 cm film, and a scratch test was performed on the surface of the film with a diamond tip. The artificially made scratches were exposed to 120 W of fluorescent ultraviolet light having a wavelength of 302 nm for 30 minutes. It can be seen that after self-healing, the original clear scratches almost disappeared.

The principle may be as shown in scheme 1:

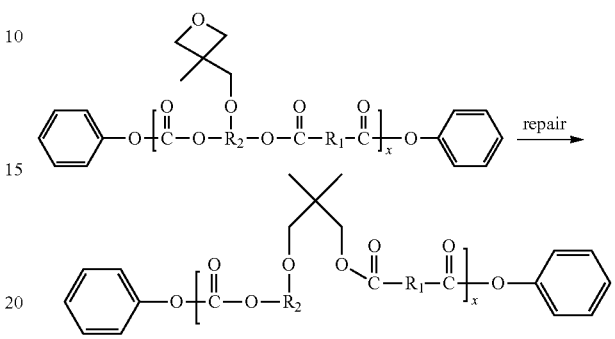

Scheme 1

In summary, the self-healing copolymerized polycarbonate material prepared by the method of the present invention has self-healing property and biodegradability. The self-healing copolymerized polycarbonate is obtained by introducing a modified reducing sugar into the main chain of polycarbonate, belonging to block copolymerization, which ensures the consistency and uniformity of the product. In addition, the block introduced into the main chain is green and environmentally friendly, and the original intention of clean production of polycarbonate has not been changed.

In the specification, the description with reference to the terms "one embodiment", "some embodiments", "examples", "specific examples", or "some examples" and the like means that the specific features, structures, materials, or characteristics described in combination with the embodiments or examples are included in at least one embodiment or example of the present invention. In the specification, the schematic expressions of the above terms are not necessarily directed to the same embodiment or example. Moreover, the specific features, structures, materials, or characteristics described may be combined in any one or more embodiments or examples in any suitable manner. In addition, without any contradiction, those skilled in the art may combine and assemble different embodiments or examples and features of the different embodiments or examples described in the specification.

Although the embodiments of the present invention have been shown and described above, it can be understood that the above embodiments are exemplary and should not be construed as limitations on the present invention. Those skilled in the art may carry out change, modification, substitution, and variation of the above embodiments within the scope of the invention.

What is claimed is:
1. A method for preparing a self-healing copolymerized polycarbonate, comprising the following steps:
S101: mixing a reducing sugar, an oxetane derivative and a first catalyst, heating the mixture to 50 to 80° C., and stirring and reacting under a protective gas condition for 0.5 to 2 h to obtain a first product, wherein:
the molar ratio of the reducing sugar to the oxetane derivative is (0.5-0.8):1; and
the reducing sugar is at least one of glucose, fructose, galactose, lactose and maltose;

S102: adding a diol, a diester, and a second catalyst to the first product, and then heating to 180 to 220° C. for 2 to 4 h to obtain an oligomer, wherein the molar ratio of the first product, the diol and the diester is (0.07-0.13):(0.9-1.0):1; and S103: heating the oligomer to 230 to 270° C. and holding at the temperature and reacting for 1 to 3 h to obtain a self-healing copolymerized polycarbonate.

2. The method for preparing a self-healing copolymerized polycarbonate in claim 1, wherein in the step S101, the oxetane derivative is at least one of 3-(chloromethyl)-3-methyloxetane, 3-(bromomethyl)-3-methyloxetane, 3-(bromomethyl)-3-ethyloxetane, and 3-(chloromethyl)-3-ethyloxetane.

3. The method for preparing a self-healing copolymerized polycarbonate in claim 1, wherein in the step S101, the catalyst is a Lewis base.

4. The method for preparing a self-healing copolymerized polycarbonate in claim 1, wherein in the step S101, the catalyst is at least one of KOH, $K_2CO_3$, and $CsCO_3$.

5. The method for preparing a self-healing copolymerized polycarbonate in claim 1, wherein in the step S101, the protective gas is nitrogen gas.

6. The method for preparing a self-healing copolymerized polycarbonate in claim 1, wherein in the step S102, the diol is bisphenol A, and the diester is diphenyl carbonate.

7. The method for preparing a self-healing copolymerized polycarbonate in claim 1, wherein in step S101, the mass of the first catalyst is 0.05 to 0.1% of the mass of the reducing sugar.

8. The method for preparing a self-healing copolymerized polycarbonate in claim 1, wherein in the step S102, the ratio of the total molar mass of the first product and the diol to the molar mass of the diester is $1.03:1 \leq n_1:n_2 \leq 1.1:1$, wherein $n_1$ represents the total molar mass of the first product and the diol, and $n_2$ represents the molar mass of the diester.

9. A self-healing copolymerized polycarbonate, prepared by a method for preparing a self-healing copolymerized polycarbonate, comprising the following steps:

S101: mixing a reducing sugar, an oxetane derivative and a first catalyst, heating the mixture to 50 to 80° C., and stirring and reacting under a protective gas condition for 0.5 to 2 h to obtain a first product, wherein the molar ratio of the reducing sugar to the oxetane derivative is (0.5-0.8):1;

S102: adding a diol, a diester, and a second catalyst to the first product, and then heating to 180 to 220° C. for 2 to 4 h to obtain an oligomer, wherein the molar ratio of the first product, the diol and the diester is (0.07-0.13):(0.9-1.0):1; and S103: heating the oligomer to 230 to 270° C. and holding at the temperature and reacting for 1 to 3 h to obtain a self-healing copolymerized polycarbonate.

10. The self-healing copolymerized polycarbonate in claim 9, wherein in the step S101, the reducing sugar is at least one of glucose, fructose, galactose, lactose and maltose.

11. The self-healing copolymerized polycarbonate in claim 9, wherein in the step S101, the oxetane derivative is at least one of 3-(chloromethyl)-3-methyloxetane, 3-(bromomethyl)-3-methyloxetane, 3-(bromomethyl)-3-ethyloxetane, and 3-(chloromethyl)-3-ethyloxetane.

12. The self-healing copolymerized polycarbonate in claim 9, wherein in the step S101, the catalyst is a Lewis base.

13. The self-healing copolymerized polycarbonate in claim 9, wherein in the step S101, the catalyst is at least one of KOH, $K_2CO_3$, and $CsCO_3$.

14. The self-healing copolymerized polycarbonate in claim 9, wherein in the step S101, the protective gas is nitrogen gas.

15. The self-healing copolymerized polycarbonate in claim 9, wherein in the step S102, the diol is bisphenol A, and the diester is diphenyl carbonate.

16. The self-healing copolymerized polycarbonate in claim 9, wherein in step S101, the mass of the first catalyst is 0.05 to 0.1% of the mass of the reducing sugar.

17. The self-healing copolymerized polycarbonate in claim 9, wherein in the step S102, the ratio of the total molar mass of the first product and the diol to the molar mass of the diester is $1.03:1 \leq n_1:n_2 \leq 1.1:1$, wherein $n_1$ represents the total molar mass of the first product and the diol, and $n_2$ represents the molar mass of the diester.

* * * * *